(12) United States Patent
Yoshinaga et al.

(10) Patent No.: US 11,407,910 B2
(45) Date of Patent: Aug. 9, 2022

(54) RUBBER COMPOSITION FOR ADDITIVE MANUFACTURING

(71) Applicant: SUMITOMO RUBBER INDUSTRIES, LTD., Kobe (JP)

(72) Inventors: Hisao Yoshinaga, Kobe (JP); Takuro Akasaka, Kobe (JP); Nami Masao, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 269 days.

(21) Appl. No.: 16/639,041

(22) PCT Filed: Aug. 7, 2018

(86) PCT No.: PCT/JP2018/029529
§ 371 (c)(1),
(2) Date: Feb. 13, 2020

(87) PCT Pub. No.: WO2019/035387
PCT Pub. Date: Feb. 21, 2019

(65) Prior Publication Data
US 2020/0181433 A1 Jun. 11, 2020

(30) Foreign Application Priority Data
Aug. 15, 2017 (JP) .............................. JP2017-156793

(51) Int. Cl.
*C09D 11/108* (2014.01)
*B33Y 70/00* (2020.01)
(Continued)

(52) U.S. Cl.
CPC ............ *C09D 11/108* (2013.01); *B33Y 70/00* (2014.12); *C08F 279/02* (2013.01);
(Continued)

(58) Field of Classification Search
CPC ...... C09D 11/101; C09D 11/108; B33Y 70/00
See application file for complete search history.

(56) References Cited

U.S. PATENT DOCUMENTS

2006/0094851 A1* 5/2006 Audenaert ............ C07C 267/00
528/44
2016/0145452 A1* 5/2016 Fong ..................... B29C 64/112
524/521

(Continued)

FOREIGN PATENT DOCUMENTS

| JP | 2015-168135 A | 9/2015 |
| JP | 2016-113518 A | 6/2016 |

(Continued)

OTHER PUBLICATIONS

International Search Report for PCT/JP2018/029529 dated Sep. 4, 2018.

(Continued)

*Primary Examiner* — Vu A Nguyen
(74) *Attorney, Agent, or Firm* — Birch, Stewart, Kolasch & Birch LLP

(57) ABSTRACT

There is provided a rubber composition for additive manufacturing that allows a rubber shaped article to be favorably produced using an additive manufacturing apparatus, and allows the obtained rubber shaped article to achieve both high mechanical strength and excellent elongation. The rubber composition for additive manufacturing comprises a liquid rubber, an amine-based urethane acrylate oligomer, and a monomer, wherein a total content of the amine-based urethane acrylate oligomer and the monomer is 30 parts by mass or more, per 100 parts by mass of the liquid rubber.

14 Claims, 2 Drawing Sheets

(a)

(b)

(51) Int. Cl.
    *B33Y 10/00*     (2015.01)
    *C09D 11/101*     (2014.01)
    *C09D 11/30*     (2014.01)
    *C09D 121/00*     (2006.01)
    *C08F 279/02*     (2006.01)
    *B29C 64/112*     (2017.01)

(52) U.S. Cl.
    CPC ............ *C09D 11/101* (2013.01); *C09D 11/30* (2013.01); *C09D 121/00* (2013.01); *B29C 64/112* (2017.08); *B33Y 10/00* (2014.12)

(56) References Cited

U.S. PATENT DOCUMENTS

2019/0002713 A1    1/2019    Fong et al.
2019/0010311 A1    1/2019    Yoshinaga et al.

FOREIGN PATENT DOCUMENTS

| JP | 2016-186327 A | 10/2016 | |
|---|---|---|---|
| WO | WO 2016/085863 A1 | 6/2016 | |
| WO | WO 2017/044381 A1 | 3/2017 | |
| WO | WO-2017047615 A1 * | 3/2017 | ............... A61K 8/87 |
| WO | WO 2017/154335 A1 | 9/2017 | |

OTHER PUBLICATIONS

Written Opinion of the International Searching Authority for PCT/JP2018/029529 (PCT/ISA/237) dated Sep. 4, 2018.
Extended European Search Report for European Application No. 18846377.2, dated Mar. 26, 2021.

* cited by examiner (a)

(b)

(a)

(b)

RUBBER COMPOSITION FOR ADDITIVE MANUFACTURING

TECHNICAL FIELD

The present invention relates to a rubber composition for additive manufacturing, a rubber shaped article obtained by curing the composition, and a method for producing a rubber shaped article using the composition.

BACKGROUND ART

In recent years, additive manufacturing apparatuses (so-called 3D printers) for producing three-dimensional structures by depositing and curing layers of resin on the basis of the design data of the three-dimensional structures have been put to practical use. Many methods are known for such additive manufacturing apparatuses, including an ink-jet method, a method in which a photocurable resin is cured by laser beam irradiation, and a method in which layers of a melted ABS resin or the like are deposited.

For example, the ink-jet method produces a three-dimensional structure by discharging microdroplets of a photocurable liquid resin composition from a nozzle to draw a pattern with a predetermined shape, irradiating the pattern with UV light to form a cured thin film, and repeatedly depositing such films. Moreover, for example, fused deposition modeling produces a three-dimensional structure by melting a solid ABS resin or the like by heating, dropping the melted resin from a nozzle to draw a pattern with a predetermined shape, cooling the resin to reduce the flowability, and repeating this process to deposit layers of the resin.

CITATION LIST

Patent Literature

Patent Literature 1: JP 2015-168135 A

SUMMARY OF INVENTION

Technical Problem

Three-dimensional structures produced using an additive manufacturing apparatus that are made of resins are generally known. On the other hand, rubber has low temperature dependence in terms of elastic modulus compared to resins, and has a low compression set; therefore, if three-dimensional structures made of rubber (rubber shaped articles) can be produced, these structures are expected to be used for applications different from those of three-dimensional structures made of resins or metals.

Under such circumstances, it is a main object of the present invention to provide a rubber composition for additive manufacturing that allows a rubber shaped article to be favorably produced using an additive manufacturing apparatus, and allows the obtained rubber shaped article to achieve both high mechanical strength and excellent elongation. It is another object of the present invention to provide a rubber shaped article obtained by curing the rubber composition for additive manufacturing, and a method for producing a rubber shaped article using the composition.

Solution to Problem

The inventors of the present invention conducted extensive research to solve the aforementioned problem. As a result, they found that when a rubber composition for additive manufacturing comprising a liquid rubber, an amine-based urethane acrylate oligomer, and a monomer, wherein a total content of the amine-based urethane acrylate oligomer and the monomer is 30 parts by mass or more, per 100 parts by mass of the liquid rubber, is used for an additive manufacturing method, a rubber shaped article is favorably obtained, and the rubber shaped article achieves both high mechanical strength and excellent elongation. The present invention was completed as a result of further research based on these findings.

In summary, the present invention provides aspects of the invention as itemized below:

Item 1. A rubber composition for additive manufacturing comprising:

a liquid rubber, an amine-based urethane acrylate oligomer, and a monomer, wherein a total content of the amine-based urethane acrylate oligomer and the monomer is 30 parts by mass or more, per 100 parts by mass of the liquid rubber.

Item 2. The rubber composition for additive manufacturing according to item 1, wherein the amine-based urethane acrylate oligomer has a functionality of 2 to 6.

Item 3. The rubber composition for additive manufacturing according to item 1 or 2, wherein the monomer is a monofunctional monomer.

Item 4. The rubber composition for additive manufacturing according to any one of items 1 to 3, further comprising a filler.

Item 5. The rubber composition for additive manufacturing according to any one of items 1 to 3, wherein a content of the liquid rubber is 30 mass % or more.

Item 6. The rubber composition for additive manufacturing according to any one of items 1 to 4, wherein a viscosity as measured using an E-type viscometer at an amplitude of 1% and a frequency of 1 Hz, in an environment at a temperature of 35° C. and a relative humidity of 50%, is 1000 Pa·s or less.

Item 7. A rubber shaped article, which is a cured product of the rubber composition for additive manufacturing according to any one of items 1 to 6.

Item 8. The rubber shaped article according to item 7, wherein energy at break, which is a product of a value of tensile strength at break (MPa) and a value of elongation at break (%), is 400 or more.

Item 9. The rubber shaped article according to item 7 or 8, wherein the tensile strength at break is 2.0 MPa or more.

Item 10. The rubber shaped article according to any one of items 7 to 9, wherein the elongation at break is 90% or more.

Item 11. The rubber shaped article according to any one of items 7 to 10, wherein a Shore A hardness is within a range of 35 to 90.

Item 12. The rubber shaped article according to any one of items 7 to 11, wherein a compression set (24 hours) is 25% or less.

Item 13. A method for producing a rubber shaped article comprising:

a layer deposition step of depositing layers of the rubber composition for additive manufacturing according to any one of claims 1 to 6; and a curing step of curing the deposited layers of the rubber composition for additive manufacturing.

Item 14. Use of a rubber composition for additive manufacturing, the rubber composition comprising:

a liquid rubber, an amine-based urethane acrylate oligomer, and a monomer, wherein a total content of the amine-based urethane acrylate oligomer and the monomer is 30 parts by mass or more, per 100 parts by mass of the liquid rubber.

Advantageous Effects of Invention

The present invention can provide a rubber composition for additive manufacturing that allows a rubber shaped article to be favorably produced using an additive manufacturing apparatus, and allows the obtained rubber shaped article to achieve both high mechanical strength and excellent elongation. The present invention can also provide a rubber shaped article obtained by curing the rubber composition for additive manufacturing, and a method for producing a rubber shaped article using the composition.

DESCRIPTION OF EMBODIMENTS

Figure 1:
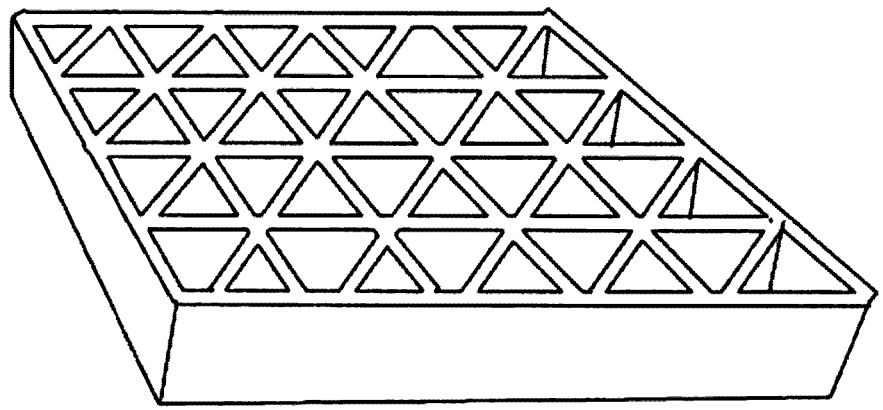
FIGS. 1(a) and (b) are a perspective view and a plan view, respectively, each showing one example of a rubber shaped article.
Figure 1:
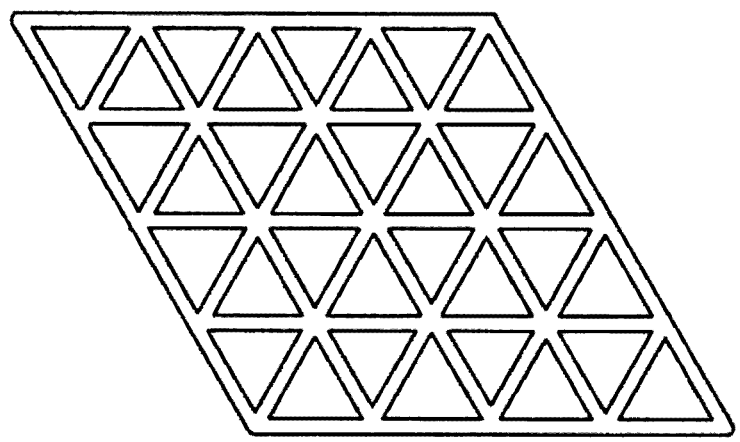

A rubber composition for additive manufacturing according to the present invention comprises a liquid rubber, an amine-based urethane acrylate oligomer, and a monomer, wherein a total content of the amine-based urethane acrylate oligomer and the monomer is 30 parts by mass or more, per 100 parts by mass of the liquid rubber. Specifically, in the present invention, in a rubber composition comprising a liquid rubber, an amine-based urethane acrylate oligomer, and a monomer as a raw material used for an additive manufacturing method, the amine-based urethane acrylate oligomer and the monomer are used in a predetermined amount based on the amount of the liquid rubber. This allows a rubber shaped article to be favorably produced using an additive manufacturing apparatus, and allows the obtained rubber shaped article to achieve both high mechanical strength and excellent elongation. Hereinafter, the rubber composition for additive manufacturing of the present invention, a rubber shaped article obtained by curing the composition, and a method for producing a rubber shaped article using the composition will be described in detail.

As used herein, the term "rubber composition for additive manufacturing" refers to a rubber composition that is used for an additive manufacturing apparatus (a so-called 3D printer or the like) for producing a three-dimensional structure by depositing and curing layers of the rubber composition on the basis of the design data of the three-dimensional structure, for example. Many methods are known for such an additive manufacturing apparatus, including an ink-jet method, a method in which a photocurable resin is cured by laser beam irradiation, and a method in which layers of a melted ABS resin or the like are deposited. A desired rubber shaped article is obtained by repeatedly depositing layers of the rubber composition of the present invention, and curing the rubber composition.

<Rubber Composition for Additive Manufacturing>

The rubber composition for additive manufacturing of the present invention comprises a liquid rubber. The liquid rubber is not particularly limited, and any known liquid rubbers can be used. Specific examples of the liquid rubber include liquid butadiene rubber, liquid styrene-butadiene copolymer rubber, liquid isoprene-butadiene copolymer rubber, liquid isoprene rubber, liquid hydrogenated isoprene rubber, and liquid isoprene-styrene copolymer rubber. Among the above, from the viewpoint of imparting excellent rubber characteristics (for example, the below-described Shore hardnesses, elongation at break, tensile strength at break, and compression set) to a rubber shaped article obtained by curing the rubber composition, while having an appropriate viscosity for additive manufacturing, preferred are a liquid rubber having an unsaturated bond, such as a (meth)acryloyl group or a vinyl group, that is crosslinked by heat, light, electron beam, or the like, and a liquid rubber having a cyclic ether, such as an epoxy compound or an oxetane compound; in particular, a liquid rubber having a (meth)acryloyl group is preferred. A single liquid rubber or two or more liquid rubbers may be contained. As used herein, the term "(meth)acryloyl group" refers to "an acryloyl group or a methacryloyl group". The same applies to similar expressions.

While the content of the liquid rubber in the rubber composition for additive manufacturing of the present invention is not particularly limited, it is preferably 30 mass % or more, and more preferably 40 mass % or more, and the range of the content of the liquid rubber is about 30 to 70 mass %, about 30 to 60 mass %, about 40 to 70 mass %, or about 40 to 60 mass %, for example, from the viewpoint of imparting excellent rubber characteristics to a rubber shaped article obtained by curing the rubber composition, while having an appropriate viscosity for additive manufacturing, and further allowing the obtained rubber shaped article to achieve both high mechanical strength and excellent elongation.

While the number average molecular weight (Mn) of the liquid rubber is not particularly limited, it is preferably 500 or more, more preferably about 5,000 to 60,000, and still more preferably about 5,000 to 40,000, for example, from the same viewpoint as described above.

The number average molecular weight (Mn) of the liquid rubber is a value measured using gel permeation chromatography relative to polystyrene standards.

The rubber composition for additive manufacturing of the present invention comprises an amine-based urethane acrylate oligomer. In the present invention, the amine-based urethane acrylate oligomer is not particularly limited so long as it is a urethane acrylate oligomer further containing a nitrogen atom in addition to the isocyanate group in the urethane linkage.

Examples of the amine-based urethane acrylate oligomer include (meth)acrylamide-based urethane oligomers and urethane oligomers having an alkoxyalkyl (meth)acrylamide. Examples of (meth)acrylamide-based urethane oligomers include the (meth)acrylamide-based urethane oligomer disclosed in JP 2016-113518 A, for example. Examples of urethane oligomers having an alkoxyalkyl (meth)acrylamide include the urethane oligomer having an alkoxyalkyl (meth)acrylamide disclosed in JP 2016-181370 A, for example.

A (meth)acrylamide-based urethane oligomer is a urethane oligomer having a (meth)acrylamide group on an end or a side chain thereof. The (meth)acrylamide-based urethane oligomer can be synthesized using a known urethane-forming reaction technique. Specifically, the (meth)acrylamide-based urethane oligomer can be synthesized by reacting an alcohol compound (a1) having one or more hydroxy groups in one molecule, with a polyisocyanate compound (a2) having two or more isocyanate groups in one molecule and a (meth)acrylamide compound (a3) having a hydroxy group. Alternatively, the target (meth)acrylamide-based urethane oligomer can be synthesized by reacting a polyol and an isocyanate compound to synthesize a polyurethane having one or more isocyanate groups in the molecule, and then further reacting the isocyanate groups in the urethane compound with a (meth)acrylamide monomer having a hydroxyl group.

Examples of the alcohol compound (a1) having one or more hydroxy groups in one molecule include $C_{2-9}$ alkylene glycols having one or more hydroxy groups on an end or a side chain of the backbone, $C_{2-6}$ polyalkylene glycols, polyester polyols, polycarbonate polyols, polybutadiene polyols, hydrogenated polybutadiene polyols, polyisoprene polyols, and hydrogenated polyisoprene polyols. These polyols may be used alone or as a mixture of two or more.

Examples of the polyisocyanate compound (a2) having two or more isocyanate groups in one molecule include aliphatic isocyanates, such as trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisocyanate, 1,3-butylene diisocyanate, 2,4,4-trimethylhexamethylene diisocyanate, and 2,2,4-trimethylhexamethylene diisocyanate; aromatic isocyanates, such as 1,3-phenylene diisocyanate, 1,4-phenylene diisocyanate, 2,4-tolylene diisocyanate, 2,6-tolylene diisocyanate, 4,4'-diphenylmethane diisocyanate, 2,4-diphenylmethane diisocyanate, and xylylene diisocyanate; alicyclic isocyanates, such as cyclopentylene diisocyanate, cyclohexylene diisocyanate, isophorone diisocyanate, 4,4'-dicyclohexylmethane diisocyanate, methylcyclohexylene diisocyanate, 2,5-norbornane diisocyanate, and 2,6-norbornane diisocyanate; and polymers thereof, for example, those of the adduct type, the isocyanurate type, the biuret type, and the like. These polyisocyanates may be used alone or as a mixture of two or more.

Examples of the (meth)acrylamide compound (a3) having a hydroxy group include a compound represented by the following general formula:

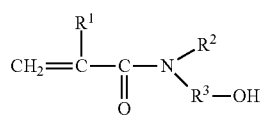

In the general formula, $R^1$ is a hydrogen atom or a methyl group; $R^2$ is a hydrogen atom, a $C_{1-6}$ alkyl group, or a hydroxyalkyl group; and $R^3$ is a $C_{1-6}$ alkylene group or a phenylene group.

While the weight average molecular weight of the (meth)acrylamide-based urethane oligomer is not particularly limited, it is preferably about 1,000 to 50,000, and more preferably about 2,000 to 20,000, from the viewpoint of imparting excellent rubber characteristics to a rubber shaped article obtained by curing the rubber composition, while imparting an appropriate viscosity for additive manufacturing to the rubber composition, and further imparting high mechanical strength and excellent elongation to the rubber shaped article.

A urethane oligomer having an alkoxyalkyl (meth)acrylamide is produced by the addition reaction between a (meth)acrylamide having a hydroxy group and an isocyanate compound, and is characterized by having a (meth)acrylamide group as a photocurable functional group.

The urethane oligomer having an alkoxyalkyl (meth)acrylamide can be synthesized using a known urethane-forming reaction technique. Specifically, the urethane oligomer having an alkoxyalkyl (meth)acrylamide can be synthesized by reacting a monofunctional or polyfunctional alcohol (b1) (hereinafter sometimes abbreviated as polyol (b1)) having, as the backbone, a polymer having one or more repeating units selected from butadiene, hydrogenated butadiene, isoprene, hydrogenated isoprene, carbonates, ethers, esters, and silicones; an isocyanate monomer (b2) having two or more isocyanate groups in one molecule; and a (meth)acrylamide (b3) having a hydroxy group. Alternatively, from the viewpoint of achieving a further reduction in the content of low-molecular-weight components, the target urethane oligomer having an alkoxyalkyl (meth)acrylamide can be obtained by initially reacting the polyol (b1) and the isocyanate monomer (b2) to synthesize an isocyanate compound having one or more isocyanate groups in the molecule, and then reacting the isocyanate compound with the (meth)acrylamide (b3) having a hydroxy group.

Examples of a polybutadiene-based polyol (b1) include those having a backbone selected from the group consisting of polybutadiene, hydrogenated polybutadiene, polyisoprene, and hydrogenated polyisoprene, and having one or more hydroxy groups on an end or a side chain of the backbone. In view of industrial availability and handleability, the polybutadiene-based polyol (b1) is preferably a liquid polybutadiene-based polyol (b1) having hydroxy group(s) on both ends, which contains a 1,4-vinyl bond and/or a 1,2-vinyl bond in the molecule, or contains hydrogenated vinyl group(s) thereof in the molecule.

Examples of a polycarbonate-based polyol (b1) include those obtained by the transesterification reaction of a diol and a carbonate as raw materials, and having a backbone formed of a carbonate group and having one or more hydroxy groups on an end or a side chain of the backbone chain. In view of industrial availability and handleability, the polycarbonate-based polyol (b1) is preferably a liquid polycarbonate-based polyol (b1) having a carbonate backbone in the molecule, and having hydroxy group(s) on both ends.

A polyether-based polyol (b1) (that is, a polyether polyol) has a polyether backbone in the molecule, and has one or more hydroxy groups on an end or a side chain of the backbone. A silicone-based polyol (b1) (that is, a silicone polyol) has a silicone backbone in the molecule, and has one or more hydroxy groups on an end or a side chain of the backbone.

Examples of the isocyanate monomer (b2) having two or more isocyanate groups in one molecule include aliphatic isocyanates, such as hexamethylene diisocyanate and trimethylhexamethylene diisocyanate (2,2,4-, 2,4,4-, or a mixture thereof); aromatic isocyanates, such as 1,3- or 1,4-phenylene diisocyanate, 2,4- or 2,6-tolylene diisocyanate, 4,4'- or 2,4-diphenylmethane diisocyanate, and xylylene diisocyanate; alicyclic isocyanates, such as cyclohexylene diisocyanate, isophorone diisocyanate, 4,4'-dicyclohexylmethane diisocyanate, methylcyclohexylene diisocyanate, and 2,5- or 2,6-norbornane diisocyanate; and the adduct type, the isocyanurate type, the biuret type, and the like thereof. These isocyanate monomers (b2) may be used alone or as a mixture of two or more.

The (meth)acrylamide (b3) having a hydroxy group is a methacrylamide containing a hydroxy group or an acrylamide containing a hydroxy group. Such (meth)acrylamides (b3) having a hydroxy group can be used alone or in combinations of two or more. It is particularly preferred to use an acrylamide containing a hydroxy group, which significantly improves the curing properties.

Examples of the (meth)acrylamide (b3) having a hydroxy group include N-hydroxymethyl(meth)acrylamide, N-hydroxyethyl(meth)acrylamide, N-hydroxypropyl(meth)acrylamide, N-hydroxyisopropyl(meth)acrylamide, N-methylhydroxymethyl(meth)acrylamide, N-methylhydroxyethyl(meth)acrylamide, N-methylhydroxypropyl(meth)acrylamide, N-methylhydroxyisopropyl(meth)acrylamide, N-ethylhydroxymethyl(meth)acrylamide, N-ethylhydroxyethyl(meth)acrylamide, N-ethylhydroxypropyl(meth)acrylamide, N-ethylhydroxyisopropyl(meth)acrylamide, N-propylhydroxymethyl(meth)acrylamide, N-propylhydroxyethyl(meth)acrylamide, N-propylhydroxypropyl(meth)acrylamide, N-propylhydroxyisopropyl(meth)acrylamide, N-isopropylhydroxyethyl(meth)acrylamide, N-isopropylhydroxypropyl(meth)acrylamide, N-isopropylhydroxyisopropyl(meth)acrylamide, N,N-dihydroxymethyl(meth)acrylamide, N,N-dihydroxyethyl(meth)acrylamide, N,N-dihydroxypropyl(meth)acrylamide, and N,N-dihydroxyisopropyl(meth)acrylamide. These (meth)acrylamides (b3) having a hydroxy group may be used alone or as a mixture of two or more.

While the weight average molecular weight of the urethane oligomer having an alkoxyalkyl (meth)acrylamide is not particularly limited, it is preferably about 1,000 to 100,000, and more preferably about 1,500 to 60,000, from the viewpoint of imparting excellent rubber characteristics to a rubber shaped article obtained by curing the rubber composition, while imparting an appropriate viscosity for additive manufacturing to the rubber composition, and further imparting high mechanical strength and excellent elongation to the rubber shaped article.

The average functionality of the urethane oligomer having an alkoxyalkyl (meth)acrylamide (that is, the average number of alkoxyalkyl (meth)acrylamide groups contained in one molecule) is preferably 1.2 to 20, and more preferably 1.5 to 10, from the same viewpoint as described above.

While the functionality of the amine-based urethane acrylate oligomer is not particularly limited, the amine-based urethane acrylate oligomer preferably has a functionality of about 2 to 6, more preferably about 2 to 4, and still more preferably 2, from the same viewpoint as described above.

Examples of commercial products of the amine-based urethane acrylate oligomer include trade name "KJSA-7100" manufactured by KJ Chemicals Corporation.

Examples of the monomer contained in the rubber composition for additive manufacturing of the present invention include, although not particularly limited to, monofunctional monomers and polyfunctional monomers. The monomer is preferably a monofunctional monomer, from the viewpoint of imparting excellent rubber characteristics to a rubber shaped article obtained by curing the rubber composition, while imparting an appropriate viscosity for additive manufacturing to the rubber composition, and further imparting high mechanical strength and excellent elongation to the rubber shaped article. Examples of preferred monofunctional monomers include monofunctional acrylates.

Specific examples of the monofunctional monomer include phenoxyethyl (meth)acrylate, phenoxy-2-methylethyl (meth)acrylate, phenoxyethoxyethyl (meth)acrylate, 3-phenoxy-2-hydroxypropyl (meth)acrylate, 2-phenylphenoxyethyl (meth)acrylate, 4-phenylphenoxyethyl (meth)acrylate, 3-(2-phenylphenyl)-2-hydroxypropyl (meth)acrylate, (meth)acrylate of p-cumylphenol reacted with ethylene oxide, 2-bromophenoxyethyl (meth)acrylate, 2,4-dibromophenoxyethyl (meth)acrylate, 2,4,6-tribromophenoxyethyl (meth)acrylate, phenoxy (meth)acrylate modified with a plurality of moles of ethylene oxide or propylene oxide, isobornyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acrylate, 4-butylcyclohexyl (meth)acrylate, acryloylmorpholine, 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, isobutyl (meth)acrylate, t-butyl (meth)acrylate, amyl (meth)acrylate, isoamyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, lauryl (meth)acrylate, stearyl (meth)acrylate, isostearyl (meth)acrylate, tetrahydrofurfuryl (meth)acrylate, butoxyethyl (meth)acrylate, ethoxydiethylene glycol (meth)acrylate, polyethylene glycol mono(meth)acrylate, polypropylene glycol mono(meth)acrylate, methoxyethylene glycol (meth)acrylate, ethoxyethyl (meth)acrylate, methoxypolyethylene glycol (meth)acrylate, methoxypolypropylene glycol (meth)acrylate, diacetone (meth)acrylamide, isobutoxymethyl (meth)acrylamide, N,N-dimethyl (meth)acrylamide, t-octyl (meth)acrylamide, dimethylaminoethyl (meth)acrylate, diethylaminoethyl (meth)acrylate, 7-amino-3,7-dimethyloctyl (meth)acrylate, N,N-diethyl (meth)acrylamide, N,N-dimethylaminopropyl (meth)acrylamide, hydroxybutyl vinyl ether, lauryl vinyl ether, cetyl vinyl ether, 2-ethylhexyl vinyl ether, polyoxyethylene nonylphenyl ether (meth)acrylate, and vinyl monomers (such as N-vinylpyrrolidone, N-vinylcaprolactam, vinylimidazole, and vinylpyridine). Among the above, isobornyl (meth)acrylate and bornyl (meth)acrylate are particularly preferred, from the viewpoint of imparting excellent rubber characteristics to a rubber shaped article obtained by curing the rubber composition, while imparting an appropriate viscosity for additive manufacturing to the rubber composition, and further imparting high mechanical strength and excellent elongation to the rubber shaped article. These monofunctional monomers may be used alone or as a mixture of two or more.

Specific examples of the polyfunctional monomer include trimethylolpropane tri(meth)acrylate, pentaerythritol tri(meth)acrylate, pentaerythritol tetra(meth)acrylate, ethylene glycol di(meth)acrylate, tetraethylene glycol di(meth)acrylate, polyethylene glycol di(meth)acrylate, polypropylene glycol di(meth)acrylate, 1,4-butanediol di(meth)acrylate, 1,6-hexanediol di(meth)acrylate, neopentyl glycol di(meth)acrylate, trimethylolpropanetrioxyethyl (meth)acrylate, tris (2-hydroxyethyl)isocyanurate tri(meth)acrylate, tris(acryloyloxy)isocyanurate, bis(hydroxymethyl)tricyclodecane di(meth)acrylate, dipentaerythritol hexa(meth)acrylate, di(meth)acrylate of a diol that is a polyethylene oxide or propylene oxide adduct of bisphenol A, di(meth)acrylate of a diol that is an ethylene oxide or propylene oxide adduct of hydrogenated bisphenol A, epoxy (meth)acrylate obtained by the addition of a (meth)acrylate to bisphenol A diglycidyl ether, and triethylene glycol divinyl ether.

In the rubber composition for additive manufacturing of the present invention, the amine-based urethane acrylate oligomer and the monomer function as co-crosslinking agents.

The rubber composition for additive manufacturing of the present invention may or may not further contain another co-crosslinking agent, in addition to the amine-based urethane acrylate oligomer and the monomer. Specific examples of the other co-crosslinking agent include zinc acrylate, magnesium acrylate, zinc methacrylate, magnesium methacrylate, and styrene. The rubber composition for additive manufacturing of the present invention may contain one, or two or more of these other co-crosslinking agents.

In the present invention, the total content of the amine-based urethane acrylate oligomer and the monomer may be 30 parts by mass or more, per 100 parts by mass of the liquid rubber; however, it is preferably about 30 to 150 parts by mass, more preferably about 35 to 120 parts by mass, and still more preferably about 40 to 100 parts by mass, from the viewpoint of imparting excellent rubber characteristics to a rubber shaped article obtained by curing the rubber composition, while imparting an appropriate viscosity for additive manufacturing to the rubber composition, and further imparting high mechanical strength and excellent elongation to the rubber shaped article.

In the rubber composition for additive manufacturing of the present invention, while the mass ratio of the amine-based urethane acrylate oligomer to the monomer (amine-based urethane acrylate oligomer:monomer) is not particularly limited, it is preferably about 1:9 to 9:1, more preferably about 2:8 to 8:2, and still more preferably about 3:7 to 7:3, from the same viewpoint as described above.

The rubber composition for additive manufacturing of the present invention preferably comprises a radical initiator. The inclusion of a radical initiator allows curing of the above-described liquid rubber to be promoted. The radical initiator is not particularly limited, and any known radical initiators that generate radicals upon heating, light irradiation, electron beam irradiation, or the like can be used. Examples of preferred radical initiators include acetophenone, 4,4'-dimethoxybenzyl, dibenzoyl, 2-hydroxy-2-phenylacetophenone, benzophenone, benzophenone-2-carboxylic acid, benzophenone-4-carboxylic acid, benzophenone-2-carboxylic acid methyl ester, N,N,N',N'-tetraethyl-4,4'-diaminobenzophenone, 2-methoxy-2-phenylacetophenone, 2-isopropoxy-2-phenylacetophenone, 2-isobutoxy-2-phenylacetophenone, 2-ethoxy-2-phenylacetophenone, 2,2'-bis(2-chlorophenyl)-4,4',5,5'-tetraphenyl-1,2'-biimidazole, 2-(1,3-benzodioxol-5-yl)-4,6-bis(trichloromethyl)-1,3,5-triazine, 2-benzyl-2-(dimethylamino)-1-[4-(morpholino)phenyl]-1-butanone, 4,4'-dichlorobenzophenone, 2,2-diethoxyacetophenone, 2,2-dimethoxy-2-phenylacetophenone, 2,4-diethylthioxanthen-9-one, diphenyl(2,4,6-trimethylbenzoyl) phosphine oxide, phenylbis(2,4,6-trimethylbenzoyl) phosphine oxide, 1,4-dibenzoylbenzene, 2-ethyl anthraquinone, 1-hydroxycyclohexyl phenyl ketone, 2-hydroxy-2-methylpropiophenone, 2-hydroxy-4'-(2-hydroxyethoxy)-2-methylpropiophenone, 2-methyl-4'-(methylthio)-2-morpholinopropiophenone, 2-isonitrosopropiophenone, 2-phenyl-2-(p-toluenesulfonyloxy)acetophenone, phenylglyoxylic acid methyl ester, 1,2-octanedione, 1-[4-(phenylthio)-, 2-(O-benzoyloxime)], ethanone, 1-[9-ethyl-6-(2-methylbenzoyl)-9H-carbazol-3-yl]-, 1-(O-acetyloxime), and the like. These radical initiators may be used alone or in combinations of two or more.

The content of the radical initiator is preferably about 0.5 to 10 parts by mass, and more preferably about 1 to 7 parts by mass, per 100 parts by mass of the liquid rubber.

The rubber composition for additive manufacturing of the present invention may further comprise a filler. The inclusion of a filler allows the viscosity of the rubber composition for additive manufacturing or the rubber characteristics of a rubber shaped article obtained by curing the rubber composition to be adjusted. Furthermore, when the rubber composition for additive manufacturing of the present invention comprises a filler, it can impart higher mechanical strength and excellent elongation to the rubber shaped article. When the rubber composition for additive manufacturing of the present invention comprises a filler, it can achieve the following effect: the mechanical strength is further improved, and additionally, the decrease in elongation due to the inclusion of a filler is small, or the elongation is improved or reduced only slightly by the addition of a filler.

Examples of the filler include, although not particularly limited to, carbon black, silica, calcium carbonate, clay, and talc. When silica is used as the filler, surface-unmodified silica may be used. Alternatively, for example, when surface-modified silica whose surface is modified with a silane coupling agent or the like, or a mixture of silica and a silane coupling agent is used as the filler, the mechanical strength of a rubber shaped article obtained by curing the rubber composition can be further improved. These fillers may be used alone or in combinations of two or more.

Furthermore, when the rubber composition for additive manufacturing of the present invention comprises a filler, it may further comprise a silane coupling agent. In particular, when a surface-unmodified filler is used, the inclusion of a silane coupling agent allows the liquid rubber and the filler to be strongly bonded, thus allowing a rubber shaped article obtained by curing the rubber composition to be imparted with excellent rubber characteristics.

While the content of the filler is not particularly limited, it is preferably 5 mass % or more, more preferably about 5 to 70 mass %, and still more preferably about 10 to 50 mass %, from the viewpoint of imparting excellent rubber characteristics to a rubber shaped article obtained by curing the rubber composition, while having an appropriate viscosity for additive manufacturing.

The rubber composition for additive manufacturing of the present invention may further comprise a vulcanized rubber, from the viewpoint of imparting excellent rubber characteristics to a rubber shaped article obtained by curing the rubber composition, while having an appropriate viscosity for additive manufacturing. The vulcanized rubber is not particularly limited, and any known vulcanized rubbers obtained by vulcanizing natural rubbers or synthetic rubbers may be used. Examples of the rubber component constituting the vulcanized rubber include natural rubbers, isoprene rubber, butadiene rubber, styrene-butadiene rubber, butyl rubber, ethylene propylene diene rubber, ethylene propylene rubber, chloroprene rubber, acrylonitrile-butadiene rubber, chlorosulfonated polyethylene, epichlorohydrin rubber, chlorinated polyethylene, silicone rubber, fluororubber, and urethane rubber. Among the above, a vulcanized rubber obtained by vulcanizing a natural rubber is preferred, from the viewpoint of imparting excellent rubber characteristics to a rubber shaped article obtained by curing the rubber composition, while having an appropriate viscosity for additive manufacturing. A single vulcanized rubber or two or more vulcanized rubbers may be contained.

The vulcanized rubber is preferably in the form of particles, from the viewpoint of imparting excellent rubber characteristics to a rubber shaped article obtained by curing the rubber composition, while having an appropriate viscosity for additive manufacturing. While the particle diameter of the vulcanized rubber is not particularly limited, the median particle diameter is preferably about 200 µm or less, more preferably about 100 µm or less, and still more preferably about 50 µm or less, from the same viewpoint as described above.

As used herein, the median particle diameter of the vulcanized rubber refers to the median diameter (cumulative 50% of the particle diameter) measured with a laser diffraction/scattering-type particle size measurement apparatus.

While the content of the vulcanized rubber in the rubber composition for additive manufacturing of the present invention is not particularly limited, it is preferably 10 mass % or more, more preferably about 20 to 80 mass %, and still more preferably about 30 to 50 mass %, from the viewpoint of imparting excellent rubber characteristics to a rubber shaped article obtained by curing the rubber composition, while having an appropriate viscosity for additive manufacturing.

The rubber composition for additive manufacturing of the present invention may further comprise various additives, so long as the effects of the present invention are not impaired. Examples of the additives include, although not particularly limited to, polymers, dyes, pigments, leveling gents, rheology modifiers, defoaming agents, plasticizers, polymerization inhibitors, flame retardants, dispersion stabilizers, storage stabilizers, antioxidants, metals, metal oxides, metal salts, and ceramics. The rubber composition may contain a single additive or two or more additives.

While the viscosity of the rubber composition for additive manufacturing of the present invention is not particularly limited, so long as the viscosity allows drawing and layer deposition to be performed by an additive manufacturing apparatus, the viscosity of the rubber composition as measured using an E-type viscometer in an environment at a temperature of 35° C. (error within ±2° C.) and a relative humidity of 50% is preferably 1000 Pa·s or less, more preferably about 0.1 to 1000 Pa·s, and still more preferably about 1 to 700 Pa·s, from the viewpoint of having an appropriate viscosity for additive manufacturing, and imparting excellent rubber characteristics to a rubber shaped article obtained by curing the composition. More specifically, this viscosity represents a viscosity as measured using an E-type viscometer (MCR301 manufactured by Anton-Paar) at an amplitude of 1% and a frequency of 1 Hz.

The rubber composition for additive manufacturing of the present invention can be readily produced by mixing the amine-based urethane acrylate oligomer and the monomer such that the total content of the amine-based urethane acrylate oligomer and the monomer is 30 parts by mass or more, per 100 parts by mass of the liquid rubber, and further optionally mixing the radical initiator, the filler, the vulcanized rubber, the various additives, and the like.

<Rubber Shaped Article>

The rubber shaped article of the present invention is a cured product of the above-described rubber composition for additive manufacturing. Specifically, the rubber shaped article of the present invention is a product obtained by curing the rubber composition for additive manufacturing by heating, light irradiation, electron beam irradiation, or the like.

While the Shore A hardness of the rubber shaped article of the present invention may be appropriately adjusted according to the hardness required in the product, it is preferably in the range of 35 to 90, from the viewpoint of imparting excellent rubber characteristics. Moreover, while the Shore C hardness of the rubber shaped article of the present invention may be appropriately adjusted according to the hardness required in the product, it is preferably in the range of 45 to 90, from the viewpoint of imparting excellent rubber characteristics. As used herein, the Shore A hardness and the Shore C hardness of the rubber shaped article represent values measured in accordance with the methods defined in JIS K6253 and JIS K7312, respectively.

The elongation at break of the rubber shaped article of the present invention may be appropriately adjusted according to the elongation at break required in the product, and is generally about 100 to 1000% or 100 to 500%, for example; however, from the viewpoint of imparting excellent rubber characteristics, it is preferably 90% or more, and more preferably about 90 to 280%. The upper limit of the elongation at break is typically about 500%. As used herein, the elongation of the rubber shaped article represents a value measured in accordance with the method defined in JIS K6251.

The tensile strength at break of the rubber shaped article of the present invention may be appropriately adjusted according to the tensile strength at break required in the product, and is generally about 3 to 45 MPa or about 3 to 20 MPa, for example; however, from the viewpoint of imparting excellent rubber characteristics, it is preferably 2.0 MPa or more, and more preferably about 2.0 to 8.0 MPa. The upper limit of the tensile strength at break is typically about 20 MPa. As used herein, the tensile strength at break of the rubber shaped article represents a value measured in accordance with the method defined in JIS K6251.

In the rubber shaped article of the present invention, the energy at break, which is the product of the value of tensile strength at break (MPa) and the value of elongation at break (%), is preferably 400 or more, more preferably about 400 to 2500, still more preferably about 700 to 2200, and particularly preferably about 1600 to 2200.

While the compression set (after 24 hours) of the rubber shaped article of the present invention may be appropriately adjusted according to the compression set required in the product, it is preferably 25% or less, and more preferably 20% or less, from the viewpoint of imparting rubber characteristics. Moreover, while the compression set (after 0.5 hour) of the rubber shaped article of the present invention may be appropriately adjusted according to the compression set required in the product, it is preferably 50% or less, and more preferably 45% or less, from the viewpoint of imparting rubber characteristics. As used herein, the compression set of the rubber shaped article represents a value measured in accordance with the method defined in JIS K6262.

While the density of the rubber shaped article of the present invention may be appropriately adjusted according to the density required in the product, it is preferably about 0.8 to 2.2 g/cm$^3$, from the viewpoint of imparting excellent rubber characteristics.

Figure 2:
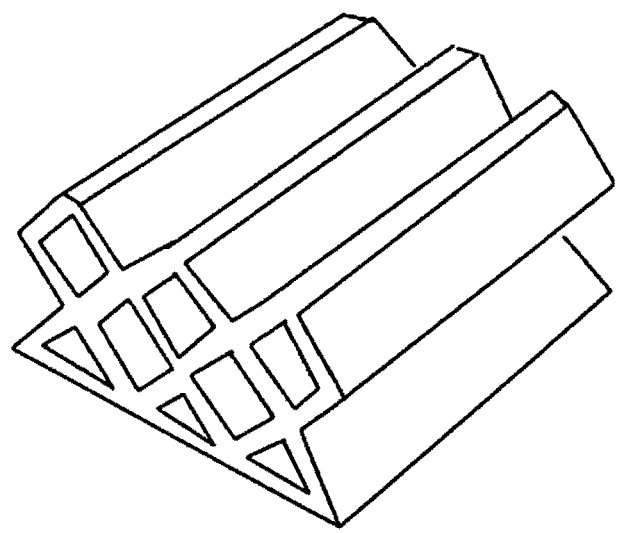
FIGS. 2(a) and (b) are a perspective view and a side view, respectively, each showing one example of a rubber shaped article.
Figure 2:
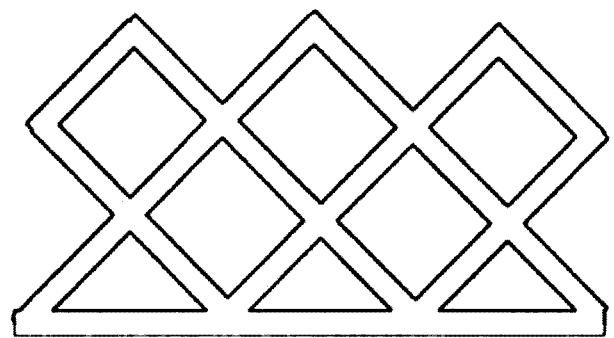

The shape of the rubber shaped article of the present invention is not particularly limited, and may be any desired shape produced using an additive manufacturing method. For example, a three-dimensional shape may be obtained by forming a layer whose plan shape is a grid shape as shown in FIG. 1, and depositing these layers. In this manner, layers with the same shape may be deposited to produce a rubber shaped article; alternatively, layers with different plan shapes may be deposited to produce a rubber shaped article. For example, as shown in FIG. 2, a rubber shaped article that is grid-shaped as viewed from the side may also be produced. In this case, the rubber composition is viscous, and, for example, each time one layer is formed, the layer is cured by light such as UV light or an electron beam; therefore, even if layers of the rubber composition are deposited in a direction inclined with respect to the vertical direction, rather than the vertical direction, the layers of the rubber composition can be deposited without collapsing. The shape of the rubber shaped article is not particularly limited, and instead of being a grid shape, it may be a hollow or solid three-dimensional shape having any of various shapes.

The method for producing the rubber shaped article of the present invention is not particularly limited, and the rubber shaped article may be produced in accordance with a known additive manufacturing method, using the above-described rubber composition for additive manufacturing as a raw material. The details of the method for producing the rubber shaped article of the present invention are as described in the <Method for Producing Rubber Shaped Article> section below.

<Method for Producing Rubber Shaped Article>

The method for producing the rubber shaped article of the present invention may employ a conventionally known additive manufacturing method that uses a liquid resin as a raw material, by using the above-described rubber composition for additive manufacturing. Specifically, by using the rubber composition for additive manufacturing of the present invention as a raw material, instead of a liquid resin, the rubber shaped article can be produced using any of various additive manufacturing methods, such as an ink-jet method, a method in which a raw material is cured by laser beam irradiation, and a method in which layers of a melted raw material are deposited.

The rubber shaped article of the present invention can be favorably produced using, for example, a method comprising a layer deposition step of depositing layers of the above-described rubber composition for additive manufacturing; and a curing step of curing the deposited layers of the rubber composition for additive manufacturing.

More specifically, for example, when the ink-jet method is adopted, microdroplets of the above-described rubber composition for additive manufacturing are discharged from a nozzle to draw a pattern with a predetermined shape to form a thin film of the rubber composition, and then the thin film is cured by heating, light irradiation, or electron beam irradiation. A thin film of the rubber composition is similarly formed on the cured thin film, and then the thin film is cured. This process is repeated to deposit cured thin films of the rubber composition. As a result, a rubber shaped article (three-dimensional structure) can be produced.

Moreover, for example, when fused deposition modeling is adopted, the viscosity of the rubber composition for additive manufacturing is reduced by heating, and the rubber composition is dropped from a nozzle, so as to be discharged to draw a pattern with a predetermined shape to form a thin film of the rubber composition, and then the thin film is cured by heating, light irradiation, or electron beam irradiation. A thin film of the rubber composition having a reduced viscosity is similarly formed on the cured thin film, and then the thin film is cured. This process is repeated to deposit cured thin films of the rubber composition. As a result, a rubber shaped article (three-dimensional structure) can be produced. In this case, at least one of the table and the nozzle for depositing layers of the rubber composition may be moved two-dimensionally or three-dimensionally to deposit layers of the rubber composition in a desired shape.

When the rubber composition for additive manufacturing is cured by heating, the heating temperature is preferably about 80 to 170° C., and more preferably about 100 to 160° C., although not particularly limited thereto. The heating time is preferably about 1 to 60 minutes, and more preferably about 5 to 30 minutes. For example, when the rubber composition for additive manufacturing is cured by light irradiation, it is preferably cured by UV irradiation at a wavelength of about 365 nm, a UV intensity of about 1 mW/cm$^2$ to 10 W/cm$^2$, and a cumulative dose of about 1 mJ/cm$^2$ to 100 J/cm$^2$. UV light may be emitted each time one layer of the rubber composition is formed, or may be emitted each time a plurality of layers are formed. Alternatively, the nozzle may be equipped with a UV irradiation device, and UV light may be emitted while the rubber composition is being discharged from the nozzle. The same also applies to irradiation of light other than UV light.

When thin films of the rubber composition are formed by discharging the rubber composition for additive manufacturing from a nozzle, the thickness of one thin film is preferably about 0.001 to 1 mm, and more preferably about 0.01 to 0.5 mm. Moreover, the diameter of the nozzle for discharging the rubber composition for additive manufacturing of the present invention, which may vary depending on the additive manufacturing method or apparatus, is preferably about 0.001 to 1 mm, and more preferably about 0.01 to 0.5 mm. The rubber composition for additive manufacturing of the present invention, which has an appropriate viscosity for additive manufacturing, is suitably used as the rubber composition to be discharged from a nozzle having such a diameter.

EXAMPLES

Examples of the present invention will be hereinafter described, although the present invention is not limited to the following examples.

Examples 1 to 11 and Comparative Examples 1 to 5

(Production of Rubber Compositions)

Rubber compositions were each prepared by mixing a liquid rubber, a radical initiator, and co-crosslinking agents in the proportions (parts by mass) shown in Table 1 or 2. Each of the rubber compositions was produced by homogeneously mixing the components. The details of each of the components are as set forth below. Table 2 shows Examples 6 and 9, Examples 7 and 10, and Examples 8 and 11 side by side for easy comparison.

Liquid rubber: UC203 (liquid isoprene rubber manufactured by Kuraray Co., Ltd., number average molecular weight: 35,000)

Radical polymerization initiator: Irgacure 1173 (manufactured by BASF Ltd.)

Co-Crosslinking Agents:

KJSA-7100 (bifunctional amine-based urethane acrylate oligomer manufactured by KJ Chemicals Corporation)

IBXA (isobornyl acrylate, monofunctional monomer, diluent)

Filler: Nipsil VN3, surface-untreated silica particles (nitrogen adsorption specific surface area (BET method): about 180 to 230 m$^2$/g, manufactured by Tosoh Corporation)

(Production of Rubber Shaped Articles)

Using the rubber composition obtained in each of the examples, a rubber shaped article having a truss structure as shown in FIG. 2(a) was produced by repeating the formation of one layer of the rubber composition and UV curing. Specifically, each time one layer (the thickness of one layer: 0.4 mm) of the rubber composition was formed by discharging the rubber composition heated to 60° C. from a nozzle (nozzle size: inner diameter: 0.25 μm), the layer was irradiated with UV light to cure the rubber composition. The UV light wavelength was 365 nm, the UV light intensity was 14 mW/cm$^2$, and the UV light irradiation time was 60 sec/layer.

(Slab Hardnesses of Rubber Shaped Articles)

For the rubber shaped article obtained in each of the examples, the Shore A hardness and the Shore C hardness were measured under the following measurement conditions, in accordance with the method defined in JIS K6253 and the method defined in JIS K7312, respectively. The results are shown in Tables 1 and 2.

(Elongation at Break)

For the rubber shaped article obtained in each of the examples, the elongation at break was measured under the following measurement conditions, in accordance with the method defined in JIS K6251. The results are shown in Tables 1 and 2.

(Tensile Strength at Break)

For the rubber shaped article obtained in each of the examples, the tensile strength at break was measured under the following measurement conditions, in accordance with the method defined in JIS K6251. The results are shown in Tables 1 and 2.

(Energy at Break)

The product of the value of tensile strength at break (MPa) and the value of elongation at break (%) obtained above was calculated as energy at break. The results are shown in Tables 1 and 2.

(Compression Set)

For the rubber shaped article obtained in each of the examples, the compression set after 0.5 hour and the compression set after 24 hours were each measured under the following measurement conditions, in accordance with the method defined in JIS K6262. The results are shown in Tables 1 and 2.

(Viscosity)

For each of the rubber compositions obtained in Examples 6 to 11, the viscosity was measured using an E-type viscometer (MCR301 manufactured by Anton-Paar) at an amplitude of 1% and a frequency of 1 Hz, in an environment at a temperature of 35° C. (error within ±2° C.) and a relative humidity of 50%. The results are shown in Table 2.

TABLE 1

| | | | Example 1 | Example 2 | Example 3 | Example 4 | Example 5 | Example 6 | Example 7 | Example 8 | Comparative Example 1 | Comparative Example 2 | Comparative Example 3 | Comparative Example 4 | Comparative Example 5 |
|---|---|---|---|---|---|---|---|---|---|---|---|---|---|---|---|
| Liquid Rubber | | UC203 | 100 | 100 | 100 | 100 | 100 | 100 | 100 | 100 | 100 | 100 | 100 | 100 | 100 |
| Radical Polymerization Initiator | | Irgacure 1173 | 3 | 3 | 3 | 3 | 3 | 3 | 3 | 3 | 3 | 3 | 3 | 3 | 3 |
| Co-Crosslinking Agent | | KJSA-7100 | 15 | 20 | 25 | 30 | 30 | 40 | 50 | 60 | 0 | 3 | 4 | 5 | 6 |
| | | IBXA | 35 | 30 | 25 | 20 | 70 | 60 | 50 | 40 | 0 | 7 | 6 | 5 | 4 |
| Physical Properties of Rubber Shaped Article | Slab Hardness | Shore A | 49 | 47 | 44 | 40 | 70 | 67 | 62 | 55 | 25 | 35 | 34 | 31 | 30 |
| | | Shore C | 66 | 65 | 65 | 62 | 78 | 76 | 76 | 70 | 50 | 59 | 57 | 55 | 53 |
| | Elongation at Break | % | 132 | 151 | 172 | 187 | 99 | 182 | 252 | 232 | 118 | 91 | 94 | 107 | 110 |
| | Tensile Strength at Break | MPa | 4.5 | 4.4 | 3.0 | 2.2 | 7.5 | 7.3 | 6.7 | 4.3 | 0.7 | 0.8 | 0.8 | 0.8 | 0.8 |
| | Energy at Break (Tensile Strength at Break × Elongation at Break) | | 594 | 664 | 516 | 411 | 743 | 1329 | 1688 | 998 | 83 | 73 | 75 | 86 | 88 |
| | Compression Set | % (after 0.5 hr) | 2 | 5 | 18 | 18 | 6 | 10 | 28 | 43 | 0 | 3 | 2 | 1 | 1 |
| | | % (after 24 hr) | 1 | 3 | 8 | 3 | 3 | 4 | 15 | 13 | 1 | 1 | 0 | 1 | 0 |

TABLE 2

| | | | Example 6 | Example 9 | Example 7 | Example 10 | Example 8 | Example 11 |
|---|---|---|---|---|---|---|---|---|
| Liquid Rubber | | UC203 | 100 | 100 | 100 | 100 | 100 | 100 |
| Radical Polymerization Initiator | | Irgacure 1173 | 3 | 3 | 3 | 3 | 3 | 3 |
| Co-Crosslinking Agent | | KJSA-7100 | 40 | 40 | 50 | 50 | 60 | 60 |
| | | IBXA | 60 | 60 | 50 | 50 | 40 | 40 |
| Filler | | Nipsil VN3 | 0 | 30 | 0 | 30 | 0 | 30 |
| Viscosity of Rubber Composition | | Pa·s @35 ± 2° C. | 27 | 57 | 49 | 54 | 91 | 101 |
| Physical Properties of Rubber Shaped Article | Slab Hardness | Shore A | 67 | 81 | 62 | 77 | 55 | 65 |
| | | Shore C | 76 | 87 | 76 | 85 | 70 | 76 |
| | Elongation at Break | % | 182 | 194 | 252 | 220 | 232 | 260 |
| | Tensile Strength at Break | MPa | 7.3 | 8.7 | 6.7 | 9.8 | 4.3 | 7.7 |
| | Energy at Break (Tensile Strength at Break × Elongation at Break) | | 1329 | 1688 | 1688 | 2156 | 998 | 2002 |

TABLE 2-continued

| | | Example 6 | Example 9 | Example 7 | Example 10 | Example 8 | Example 11 |
|---|---|---|---|---|---|---|---|
| Compression Set | % (after 0.5 hr) | 10 | 23 | 28 | 25 | 43 | 45 |
| | % (after 24 hr) | 4 | 15 | 15 | 15 | 13 | 20 |

As is clear from the results shown in Table 1, it is observed that the rubber compositions for additive manufacturing each comprising a liquid rubber, an amine-based urethane acrylate oligomer, and a monomer, wherein the total content of the amine-based urethane acrylate oligomer and the monomer is 30 parts by mass or more, per 100 parts by mass of the liquid rubber, allow a rubber shaped article to be favorably produced using an additive manufacturing apparatus, and allow the obtained rubber shaped article to achieve both high mechanical strength and excellent elongation, and have high energy at break.

Furthermore, as is clear from the results shown in Table 2, it is observed that compared with the rubber compositions for additive manufacturing of Examples 6, 7, and 8, the rubber compositions for additive manufacturing of Examples 9, 10, and 11 containing the added filler achieve both higher mechanical strength and excellent elongation, and have higher energy at break. Although the mechanical strength was expected to be improved by the addition of a filler, the elongation was expected to be reduced. However, an unexpected result was obtained for the rubber compositions for additive manufacturing of the present invention in that the elongation was improved or reduced only slightly by the addition of a filler.

The invention claimed is:

1. A rubber composition for additive manufacturing comprising:
   a liquid rubber, an amine-based urethane acrylate oligomer, and a monomer,
   wherein a total content of the amine-based urethane acrylate oligomer and the monomer is 30 parts by mass or more, per 100 parts by mass of the liquid rubber.

2. The rubber composition for additive manufacturing according to claim 1, wherein the amine-based urethane acrylate oligomer has a functionality of 2 to 6.

3. The rubber composition for additive manufacturing according to claim 1, wherein the monomer is a monofunctional monomer.

4. The rubber composition for additive manufacturing according to claim 1, further comprising a filler.

5. The rubber composition for additive manufacturing according to claim 1, wherein a content of the liquid rubber is 30 mass % or more.

6. The rubber composition for additive manufacturing according to claim 1, wherein a viscosity as measured using an E-type viscometer at an amplitude of 1% and a frequency of 1 Hz, in an environment at a temperature of 35° C. and a relative humidity of 50%, is 1000 Pa·s or less.

7. A rubber shaped article, which is a cured product of the rubber composition for additive manufacturing according to claim 1.

8. The rubber shaped article according to claim 7, wherein energy at break, which is a product of a value of tensile strength at break (MPa) and a value of elongation at break (%), is 400 or more.

9. The rubber shaped article according to claim 7, wherein the tensile strength at break is 2.0 MPa or more.

10. The rubber shaped article according to claim 7, wherein the elongation at break is 90% or more.

11. The rubber shaped article according to claim 7, wherein a Shore A hardness is within a range of 35 to 90.

12. The rubber shaped article according to claim 7, wherein a compression set (24 hours) is 25% or less.

13. A method for producing a rubber shaped article comprising:
   a layer deposition step of depositing layers of the rubber composition for additive manufacturing according to claim 1; and
   a curing step of curing the deposited layers of the rubber composition for additive manufacturing.

14. A method of additive manufacturing comprising a step of applying the rubber composition according to claim 1 to a substrate by inkjet printing.

* * * * *